(12) United States Patent
Porteous

(10) Patent No.: US 7,147,777 B1
(45) Date of Patent: Dec. 12, 2006

(54) WASTEWATER TREATMENT SYSTEM WITH MEMBRANE SEPARATORS AND PROVISION FOR STORM FLOW CONDITIONS

(75) Inventor: James Porteous, Austin, TX (US)

(73) Assignee: Eimco Water Technologies LLC, Salt Lake City, UT (US)

( * ) Notice: Subject to any disclaimer, the term of this patent is extended or adjusted under 35 U.S.C. 154(b) by 40 days.

(21) Appl. No.: 11/125,595

(22) Filed: May 9, 2005

(51) Int. Cl.
C02F 3/30 (2006.01)

(52) U.S. Cl. ................ 210/605; 210/623; 210/259

(58) Field of Classification Search ........... 210/605, 210/620, 621, 622, 623, 630, 194, 195.2, 210/252, 259
See application file for complete search history.

(56) References Cited

U.S. PATENT DOCUMENTS

| | | | |
|---|---|---|---|
| 4,948,510 A * | 8/1990 | Todd et al. ............ | 210/605 |
| 5,192,456 A | 3/1993 | Ishida et al. | |
| 5,228,996 A * | 7/1993 | Lansdell .............. | 210/605 |
| 6,277,209 B1 | 8/2001 | Yamada et al. | |
| 6,676,836 B1 * | 1/2004 | Mandt ................ | 210/605 |
| 6,712,970 B1 | 3/2004 | Trivedi | |
| 6,743,362 B1 | 6/2004 | Porteous et al. | |
| 6,843,908 B1 | 1/2005 | Okajima et al. | |
| 2005/0126963 A1 * | 6/2005 | Phagoo et al. ......... | 210/110 |
| 2006/0169636 A1 * | 8/2006 | Devine ............... | 210/605 |

FOREIGN PATENT DOCUMENTS

WO    WO 03/064335    *    8/2003

* cited by examiner

Primary Examiner—Fred G. Prince
(74) Attorney, Agent, or Firm—Thomas M. Freiburger

(57) ABSTRACT

In a wastewater treatment system and process utilizing membrane bioreactors (MBRs), multiple, parallel series of tanks or stages each include, an MBR stage. Under conditions of normal flow volume into the system, influent passes through several parallel series of stages or process lines, which might be, for example, an anoxic stage, an aeration stage and an MBR stage. From the MBR stages a portion of M.L.S.S. is cycled through one or more thickening MBRs of similar process lines, for further thickening and further processing and digesting of the sludge, while a majority portion of the M.L.S.S. is recycled back into the main process lines. During peak flow conditions, such as storm conditions in a combined storm water/wastewater system, all of the series of stages with their thickening MBRs are operated in parallel to accept the peak flow, which is more than twice normal flow. M.L.S.S. is recycled from all MBR stages to the upstream end of each of all the parallel process lines, mixing with influent wastewater, and the last one or several process lines no longer act to digest the sludge. Another advantage is that with the thickened sludge in the last process line of basins, which ordinally act to digest the sludge, there is always sufficient biomass in the system to handle peak flow, the biomass being available if needed for a sudden heavy flow or an event that might bring a toxic condition into the main basins.

21 Claims, 5 Drawing Sheets

WASTEWATER TREATMENT SYSTEM WITH MEMBRANE SEPARATORS AND PROVISION FOR STORM FLOW CONDITIONS

BACKGROUND OF THE INVENTION

This invention is concerned with wastewater treatment, and particularly a sewage treatment plant including membrane separators, in a system that can handle up to three times or more normal flow during peak flow conditions, such as storm conditions in a combined sewer system. The invention enables the use of membrane separators for both a storm event and for sludge stabilization during normal flow, with minimum operator intervention.

Membrane separators, sometimes called membrane bioreactors or MBRs, have come into increasing use in recent years, particularly in small to medium sized sewage treatment plants, as an efficient means of removing water and thickening sludge in a way that conserves space and capital cost. MBRs, however, are limited in terms of peak flow conditions, due to their inability to handle high peak flow conditions, normally no more than twice design flow. To overcome this limitation, either additional membranes must be utilized for peak flows, or flows in excess of twice design flow must be stored, in a separate basin, or bypassed.

Membrane separator systems in wastewater treatment processes are shown in U.S. Pat. Nos. 5,192,456, 6,843,908 and 6,277,209. Further, the assignee of this invention has developed a pre-thickened aerobic digestion (PAD) process using membrane thickeners in the context of sludge digestion. In one form this process incorporates membranes and an aerobic/anoxic configuration to allow simultaneous nitrification and denitrification to occur while the sludge is being thickened. See U.S. Pat. Nos. 6,712,970 and 6,743,362.

Until the current invention, membrane separators for thickening wastewater were designed essentially as a completely separate process. The MBRs in such a system were required to be designed to handle peak flow or storm conditions which could be up to three times normal flow, requiring much excess capacity and cost as regards normal flow.

SUMMARY OF THE INVENTION

In the current invention membrane separators are used to advantage in thickening sludge in a system that allows more than twice design flow during peak or storm flow conditions, without excess or idle MBR capacity during normal flow. A plurality of parallel streams of tanks or basins or zones (e.g. two to four streams, but potentially many more) have in each stream an anoxic zone, a pre-air or aeration zone and an MBR basin or zone (more zones can be included, such as multiple anoxic zones and/or an anaerobic zone). One or more additional process lines or streams of zones are similar, with anoxic, aeration and MBR zones, although this process line or lines is used differently under normal flow conditions. Normally the additional process lines are used to receive waste sludge from the other process lines, to thicken that sludge and to effect aerobic digestion or stabilization. The thickened and processed sludge (W.A.S., waste activated sludge) can then be hauled away or dewatered, or transferred to another tank for isolation, as desired, and depending to some extent on the size of the basin or basins in these additional process lines.

In the process line used for digestion, the W.A.S., which is a portion of the recycled M.L.S.S. from the regular process lines, is directed into this special process line for thickening and digestion. The remainder of that M.L.S.S. (sludge) is recycled to the influent of the normal process lines, and the only location for withdrawal of waste activated sludge, at a design solids content such as 3%, is from the special process line, such that significant digestion has occurred.

In peak flow conditions, where influent flow rate into the system may be three times or more normal design flow, or in any event more than twice normal design flow, all of the parallel process lines including the process line ordinarily used for digestion are used in the same manner, without digestion in the one or several process lines. Such peak flow can be caused by a heavy rain event for a few days (in a combined sewerage system), or a seasonal situation for several weeks or a month. With all of the parallel process lines of basins or zones on line, the process line(s) normally used for digestion is not available for digestion. During these peak flow conditions recycling of M.L.S.S. (sludge) from all MBR basins continues, mixing recycle M.L.S.S. with influent into the system, so that all basins function as MBRS and treat influent. The M.L.S.S. (sludge) can be held in the system, with M.L.S.S. gradually increasing in all basins, for an additional five to ten days or more until normal operation can be resumed. M.L.S.S. concentration can vary greatly in the system, for example, from about 8000 to 18,000 mg./l.

Another advantage of the described configuration is that with the thickened sludge in the special process line, thickened and digested during normal operation, there is additional biomass available to handle the peak flow. In other words, additional biomass is available if needed for a sudden onslaught of heavy flow, or if an event occurs bringing a toxic situation into the main basins. The sludge in the special line(s) can be used to reseed the on-line basins, redistributing this sludge to all basins. An additional advantage is that where the system has multiple lines and only two or three are in use out of e.g., six, then when additional lines are to be started up they can be seeded with the digestion sludge.

It is thus among the objects of the invention to improve efficiency of a sewage treatment system including MBRs, by including a series of process lines each with an MBR basin, some or most of the lines being used ordinarily to handle influent flow with partial wasting of resultant sludge to one or several more process lines, each also including an MBR basin, those additional process lines being used for digestion or stabilization of sludge, with further concentration, but the system being versatile so that during peak flow all process lines can be used in parallel, whereby sludge in most cases can be retained in the system for a longer period of time. These and other objects, advantages and features of the invention will be apparent from the following description of preferred embodiments, considered along with the accompanying drawings.

DESCRIPTION OF THE DRAWINGS

FIG. 1 indicates operation of the process during normal flow conditions.

DESCRIPTION OF PREFERRED EMBODIMENTS

Figure 1:
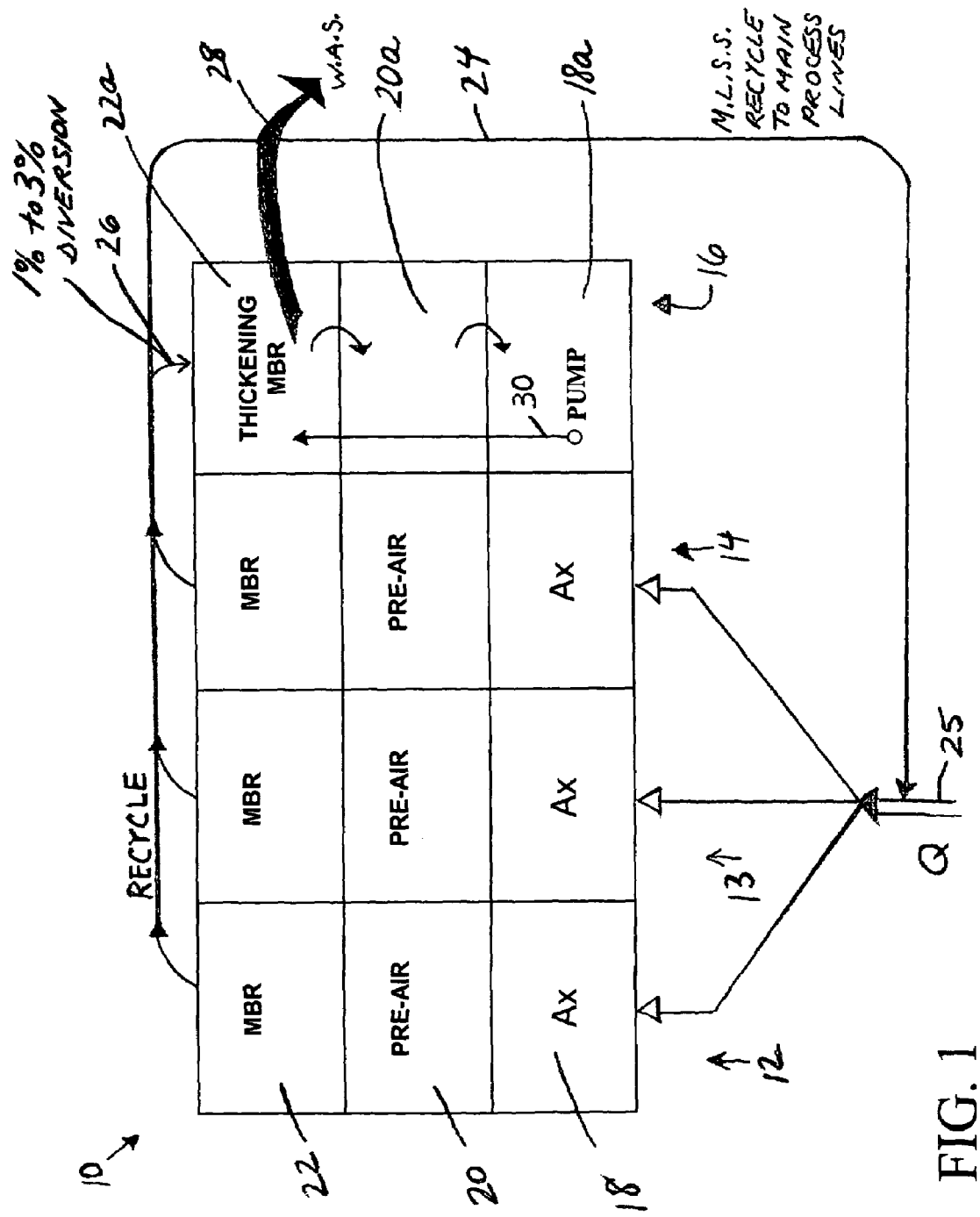
FIG. 1 is a schematic diagram indicating one example of a system of the invention, with multiple process lines, each including three tanks or zones, one of which has MBRs in each line.

FIG. 1 shows one example of the system of the invention, in normal operation. Here, a system 10 includes three normal process lines 12, 13 and 14, and an additional special process line 16 which is used differently from the other process lines. In this example the number of main process lines 12, 13 and 14 is three, with one special process line 16 shown; however, systems can be built with as few as two main process lines, up to many, even ten to twenty or more if desired, and the special process lines can also be more in number, generally less in number than the main process lines. Also, although this discussion assumes all three main process lines are active in normal flow conditions, fewer could be active at times, such as two.

Each process line preferably has at least three zones or stages, including an anoxic zone 18, a pre-aeration zone 20 and an MBR zone 22, this latter zone being effective to withdraw water and thicken the M.L.S.S. via membrane separators. It is possible to have only two zones, with the first zone alternating on/off aeration to alternate anoxic/aerobic conditions. In the anoxic zones 18 denitrification occurs, while the following zones 20 cause nitrification, thus reducing nitrogen in the M.L.S.S., especially with repeated cycles due to recycle of partially dewatered M.L.S.S. from the three main process lines 12, 13 and 14, this recycle indicated by the recycle line 24, returning to the main influent 25 and mixing with new inflow to again pass through these three main process lines.

A portion of the outflow from the three main process lines is directed into the fourth process line 16, and this is generally a small portion, such as about 0.5% to 3%, and it can be about 1%. (Note that this may be the outflow from ten or more main process lines, for example, a portion of which is being directed into three or four or more special process lines 16.) The special process line or lines 16 preferably has the same zones or stages 18, 20 and 22 as in the normal or main process lines. The portion of M.L.S.S. being diverted into this special process line(s) is thickened and digested here. As indicated by the arrow 26 in FIG. 1, the sludge entering this process line 16 may be directed essentially in the reverse direction from the normal flow through the lines 12–14, so that the sludge enters the thickening M.B.R. zone 22 first. Water is constantly withdrawn from this zone, and waste activated sludge (W.A.S.) is being withdrawn, stabilized and digested or essentially digested, as indicated by the arrow 28. Movement of M.L.S.S. from the thickening M.B.R. zone 22a to the pre-air zone 20a, and from there to the anoxic zone 18a, is also indicated, and this can be by flow over weirs or gates. Also, sludge is pumped as shown at 30, from the anoxic zone 18a to the thickening M.B.R. zone 22a. This process effects digestion of the sludge in the special process line 16. The internal recycle allows the sludge to go through anoxic/oxic treatment, generally similar to the pre-thickened aerobic digestion (P.A.D.) disclosed in Enviroquip U.S. Pat. No. 5,972,220. The W.A.S. withdrawn (at 28) from the thickening M.B.R. basin 22a may be at about 3% solids. This sludge can be hauled away, dewatered, transferred to another tank for isolation, or other further processing as desired for the particular plant and situation.

Thus, the system 10 of FIG. 1 in normal operation denitrifies the incoming and recycled wastewater (M.L.S.S.) in the main process lines (12–14), and partially dewaters to maintain M.L.S.S. at, for example, about 1% solids or more. By cycling a portion of the effluent from these main process lines to one or more special process lines such as shown at 16, and operating the special process line as described above, further thickening and digestion of the sludge is achieved, to the point that a digested sludge of a targeted solids content (for example about 3%) can be wasted to removal, isolation, dewatering or further processing.

In the illustrated example, each pre-air zone 20, 20a could be operated as a simultaneous nitrification/denitrification zone, as described in U.S. Pat. Nos. 6,712,970 and 6,743,362 referenced above, and as further described below relative to FIG. 5.

Although three zones are shown in each process line 12–14, more zones can comprise each process line. For example, zones could be in series as follows: anaerobic, anoxic, aerobic, anoxic and MBR (as in FIGS. 3 and 4, described below). Other series of stages are also possible, depending on the nature of influent and the goals in processing, and these can include a simultaneous nitrification and denitrification zone, as noted above and as described in patents referenced above.

Figure 2:
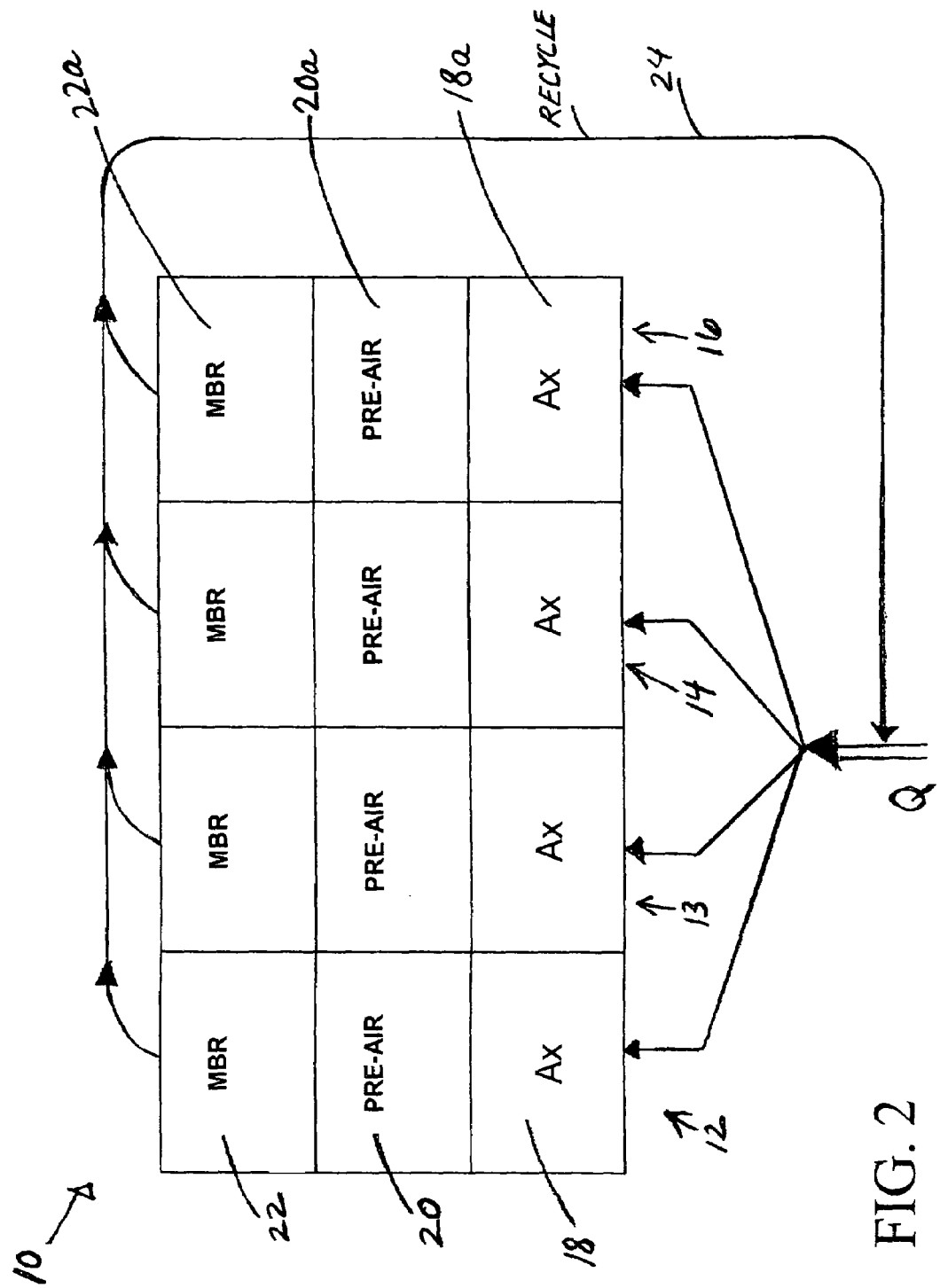
FIG. 2 is a schematic diagram similar to FIG. 1, but showing operation of the system and process during peak flow conditions.

FIG. 2 shows the same system 10 of FIG. 1 as operated in a peak flow mode. The peak flow is more than twice normal flow (MBRs in a typical system are designed to handle up to twice normal flow), and may be, for example, three times normal flow or more, depending on the ratio of the special process lines to normal process lines. In the example shown, one special process line 16 is provided alongside three normal process lines 12–14, so that, if each MBR is assumed to be capable of handling up to twice normal flow, peak flow up to 2⅔ normal design flow could be handled.

As shown in the drawing, in the storm flow mode all of the influent wastewater is divided among all process lines. The division can be equal or unequal, depending on whether the special process line or lines have greater capacity than a normal process line. Recycle flows from all process lines as indicated. Again, this recycle may be at about 1% solids, although the solids content will continue to rise if the M.L.S.S. is retained in the system, as discussed below. The change in operation can be effected by opening and closing gates or weirs, or by valves and/or pumps.

A recycle rate of 4Q can be used, as this can be an efficient recycle rate for the MBRs (although recycle can vary from 1Q to 10Q). The special process line 16 operates in the same manner as the other process lines, with denitrification occurring on a recycling basis, thus efficiently removing nitrogen from the M.L.S.S. As noted above, biomass from the normal operation of the special process line 16, this M.L.S.S. being in digestion and being rich in biomass, is redistributed among all process lines which helps maintain adequate biomass in all process lines in the event of a sudden onslaught of peak flow or peak organic load. Also as discussed above, the special process line is oversized for the digestion purpose for which it is normally used, and this helps absorb some additional volume of the peak flow. The MBRs are designed such that the peak flow can be accommodated on a continuous basis, by withdrawal of water in the M.B.R. zones 22, 22A at the same rate that new influent is accepted into the system. Solids can simply be retained in the system for a period of time, usually long enough to handle a storm event or other peak flow condition that is temporary. In the one mgd example calculated below, a four-line system such as shown in FIGS. 1 and 2 could handle a 3Q peak flow for up to about 5 days before sludge would have to be wasted from the system. The calculation is based on solids content reaching 1.8%, as the M.L.S.S. is continuously recycled along with the processing of influent.

EXAMPLE

Three normal process lines, one special process line, 1 mgd design flow, 3Q peak flow Normal Operation 2 or 3 MBR's operational 1 MBR Thickening to 30,000 mg/l (3% solids)

Feed at 10,000 mg/l from the recycle stream (1% solids)

Peak Flow Operation

All four MBR's operate in same manner, in parallel M.L.S.S. in thickening MBR included in recycle providing additional biomass redistributed over all 4 basins 3 at 10,000; 1 at 30,000

4 at 15,000 mg/l, as redistributed 1 mgd example with 3Q peaking factor (1.5 mgd of membranes since membranes can handle up to double design flow)

4 basins MBR

Each Basin Designed to Handle 3 mgd÷(2×4)=0.375 mgd

Total membranes=12,000 (based on 125 gpd design flow/membrane)

Use 8×EK400*/basin=12,800 cartridges

*EK400: Kubota model designation

MBR basin Volume 5390 ft$^3$×7.48 ft$^3$/gal×4 basins=161,269 gallons (based on tank volume recommendation for MBR area?)

Pre-Air=100,000 gallons (based on B.O.D.)

Anoxic volume 80,000 gallons (based on organic load and effluent requirements)=20,000/Basin=2,673 ft$^3$ Total Volume of all process lines=161,269+100,000+80,000=341,269

With 4 basins operating

Total Volume 1 MBR (process line)=85,317 gallons (Available Volume for Thickening/Digestion)

Sludge Production (Special Process Line, Normal Operation)

225 BOD×0.6 yield×8.34×1.0 mgd=1,126 lbs. Sludge/day at 3% = 4,500 gallons/day

= 13,501 gallons/days at 1%

Available Volume = 85,317 gallons

= 19 Days sludge retention time in digestion

The system illustrated in the example and in the drawings, and with the assumptions noted above, can handle a peak flow event for 5 days, usually a very adequate period for such an event, based on reaching a solids content of about 1.8%. If the event is of longer duration, then sludge can be wasted (at about 1.8% for this example) from the MBRs directly.

Figure 3:
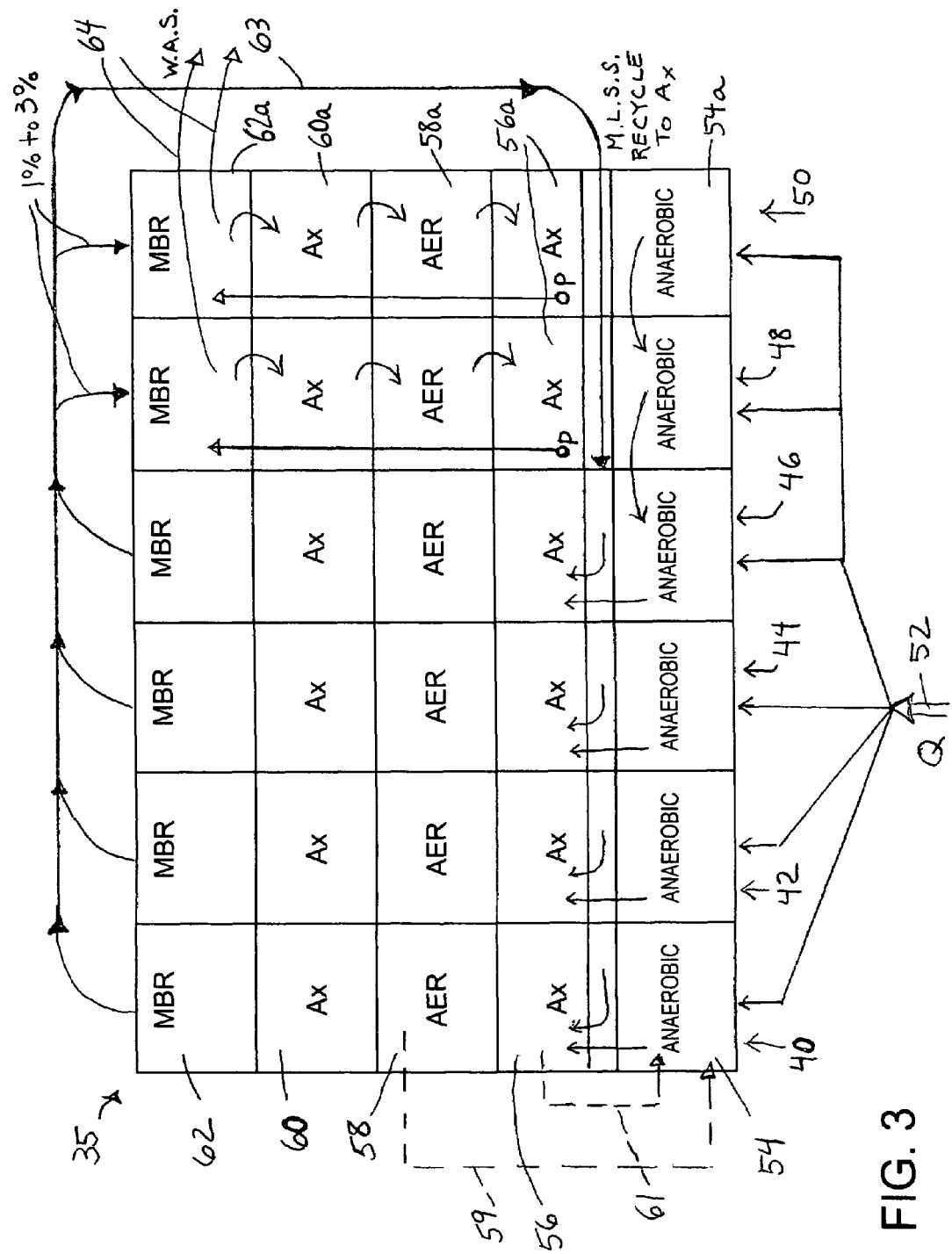
FIG. 3 is another similar schematic diagram, but showing a system with more process lines and more stages or zones in each process line, shown in a normal flow mode.
Figure 4:
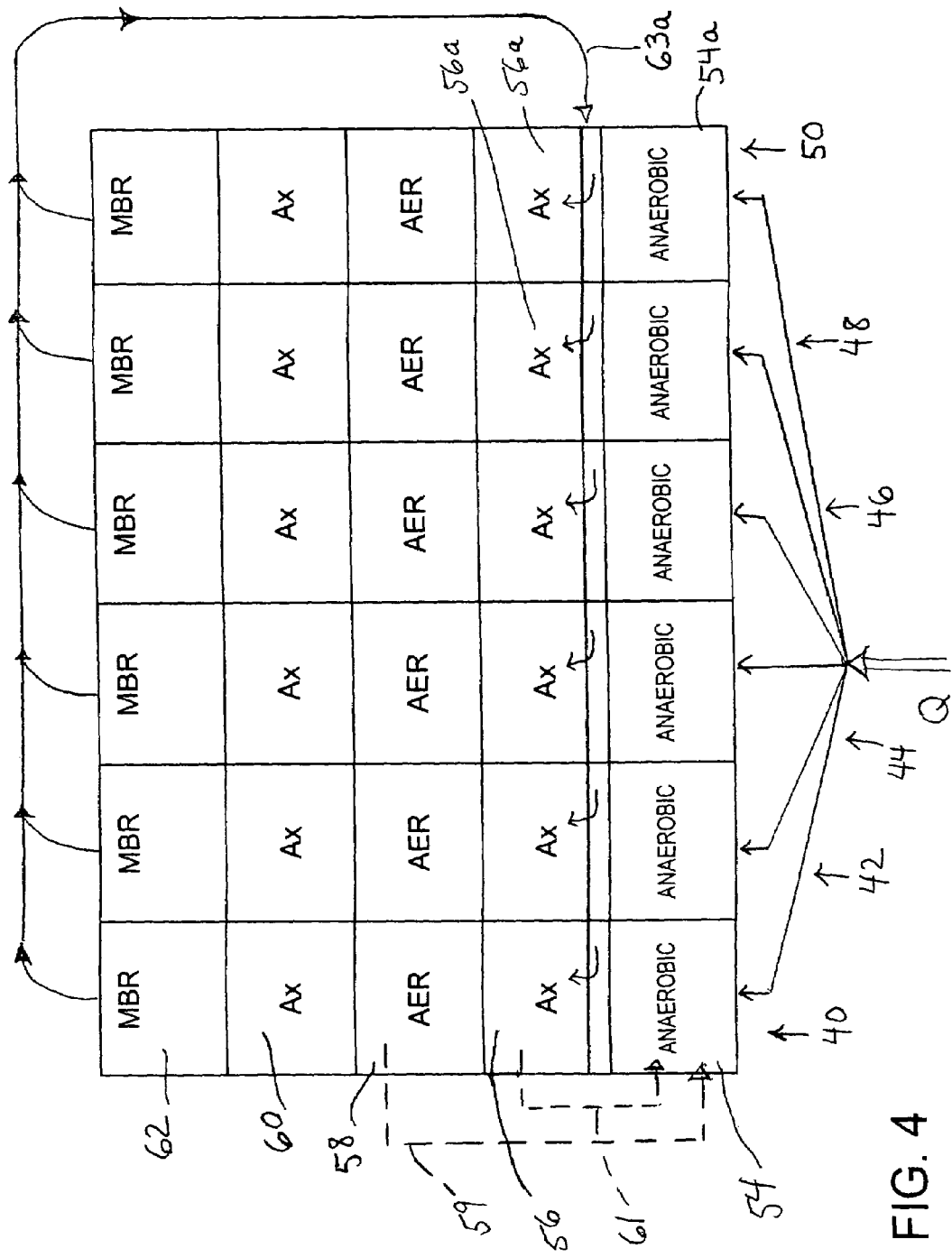
FIG. 4 is a diagram similar to FIG. 3, but showing the same system in a storm flow mode.

FIGS. 3 and 4 show a system 35 similar to that of FIGS. 1 and 2, but with some differences. The system 35 is shown with four normal process lines, 40, 42, 44 and 46, and two special process lines 48 and 50. Influent is indicated at 52. The functions of these process lines are roughly similar to those of the process lines 12–14, and the special process line 16 discussed above, respectively. There are more normal process lines and more special process lines, an option which was mentioned above. Also, the zones of each process line in this case are shown in this example as five, rather the three shown in FIGS. 1–2. This is a design issue that can vary, FIGS. 3 and 4 merely amounting to one illustration. Each zone in this example includes an anaerobic zone 54, an anoxic zone 56, an aerobic zone 58 and an anoxic zone 60, with the final zone being an MBR zone 62. In the special process lines 48 and 50 these are shown as zones 54a, 56a, 58a, 60a and 62a. Again, each aerobic zone 58 could be a simultaneous nitrification/denitrification zone, if desired.

As in the previous form of system, diversion of a portion of M.L.S.S. (such as about 1% to 3%) which exits the four main process lines again occurs, to be introduced generally in the reverse direction into the special process lines 48 and 50. Recycled M.L.S.S., shown at 63, is back to the four anoxic zones 56, usually a multiple of the inflow Q, for example about 4Q recycle. The anaerobic zones 54 are bypassed in the recycle. Additional recycle from the zones 58 to 54, or from zones 56 to 54 (indicated at 59 and 61) may be required. The dashed-line indications apply to all four main process streams.

The anaerobic zones 54a in the special process lines 48 and 50 are not included in the sludge stabilization process. Although they could be left isolated during normal flow conditions, more preferably they are fed part of the inflow as indicated in FIG. 3, with the wastewater then transferred into the main process. The inflow allocated to the process line 46 could be divided among the anaerobic zones of the three lines 46, 47, 48, with transfer as indicated from the zones 54a to the line 46, or the inflow could be apportioned as desired with transfer to several or all of the lines 40, 42, 44 and 46.

Wasting of sludge from the two thickening MBR zones 62a is shown at 64. Also, internal recycle within the special process zones 48 and 50 is included as needed for the particular system. The four recycles from zone to zone shown in FIG. 3 are only one example, and fewer recycling steps can be implemented if desired and depending on design considerations. FIG. 4 shows the same exemplary system as illustrated in FIG. 3, but in storm mode of operation. Here, as in the previously described form of system, all process zones 40–50 operate in parallel and in the same way. Sludge is retained in the system and held in the system, as water is removed via the MBRs, for a period of time permitted by system design. Recycle at 63a is to the anoxic zones 56, 56a of all six process streams. Again, internal recycle may be required, in all process streams, as indicated at either 59 or 61 during this mode of operation.

Figure 5:
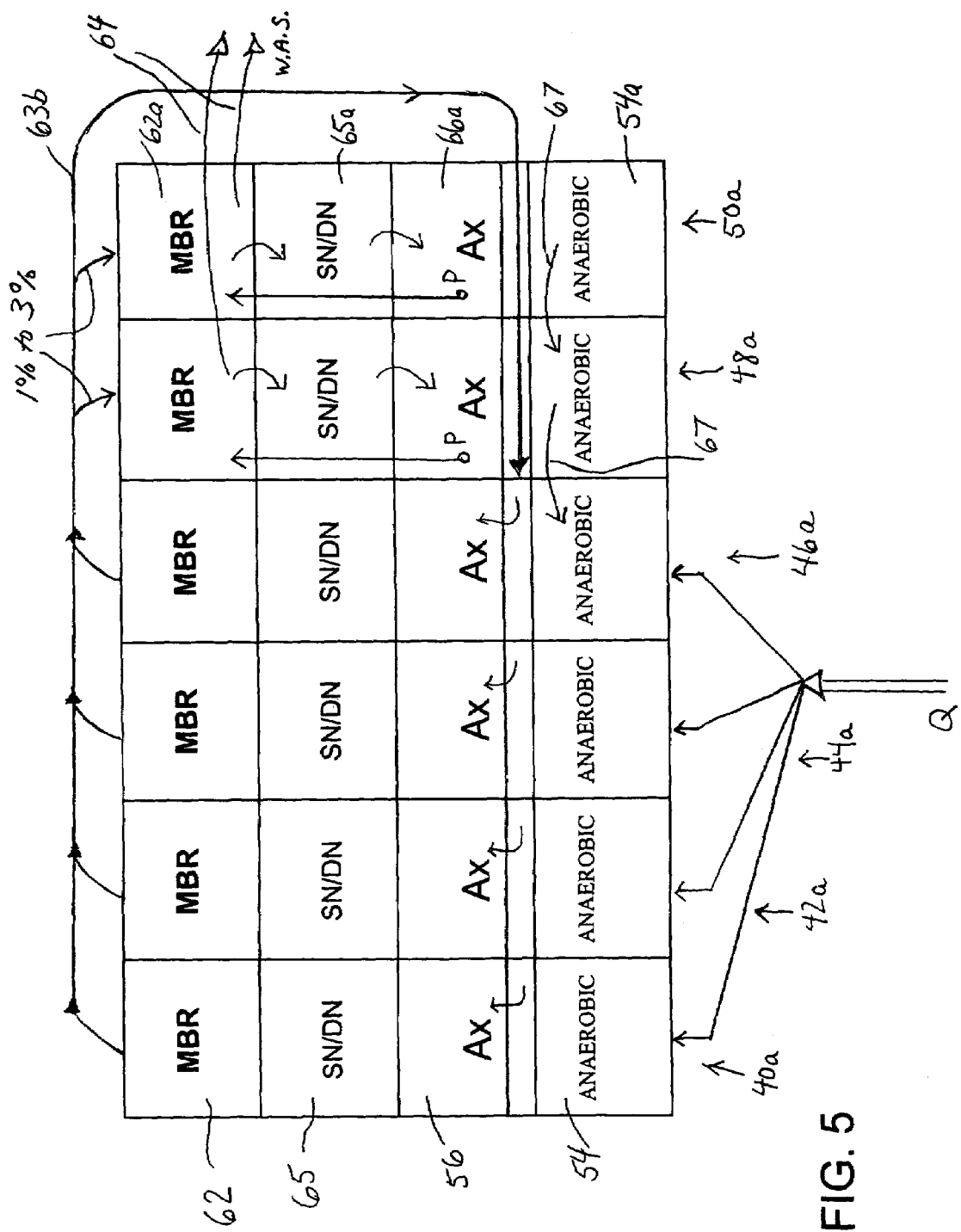
FIG. 5 is another similar diagram, showing the system similar to that of FIGS. 3–4, but with each process line having a stage 4 simultaneous nitrification and denitrification, and with the system shown in normal flow mode.

FIG. 5 shows another variation, wherein a system similar to those of FIGS. 1–4 has four normal process lines 40a–46a and two special process lines 48a and 50a. Here, the zones within each process stream are modified to include a simultaneous nitrification and denitrification (SN/DN) zone 65. Such a zone, as mentioned above, is disclosed in U.S. Pat. Nos. 6,712,970 and 6,743,362. In general the inclusion of such a zone in a wastewater treatment process line increases efficiency of the system, for reasons disclosed in those patents, reducing the number of zones required. The MBR zone 62 that follows the SN/DN zone is aerobic. The SN/DN zone in each stream is aerobic in part and anoxic in part (as taught in the referenced patents).

As FIG. 5 shows, this particular system begins in each stream with an anaerobic zone 54, followed by an anoxic zone 56, then the SN/DN zone. The main M.L.S.S. recycle 63b is to the four main process stream anoxic zones 56 in normal mode, and to all six anoxic zones in storm mode. The two anaerobic zones 54a are excluded from digestion/stabilization of sludge in the special process lines but are used in storm mode. As in FIG. 3, these anaerobic zones can be used in normal flow as additional first zones to receive some of the influent (which can be at a reduced rate compared to the zones 54 in the main process lines 40–46), but with transfer from those zones 54a to the main process lines as indicated at 67. The special process streams can include internal recycle as indicated, but other recycle arrangements can be employed as needed under design considerations. Again, internal recycle may be needed in normal flow, from zones 56 to 54 or from zones 65 to 54 (not shown).

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. A sewage treatment system with a series of parallel main process lines including anoxic and aerobic zones and an MBR zone in series, with inflow means for receiving influent wastewater into the main process lines, and at least one additional, special process line having similar zones but being normally operated to receive a portion of M.L.S.S. from the main process lines, the special process line having means for internal recycling of sludge among the zones during normal operation, so as to produce a further thickened and stabilized or digested W.A.S. to be removed from the special process line during normal operation, and including means for recycling a majority of M.L.S.S. exiting the main process lines to re-enter the main process lines to mix with wastewater in the main process lines, whereby the system can be operated in a second, surge or storm mode of operation at more than twice normal design flow, wherein all process lines are operated in the same manner, with parallel streams of wastewater being processed serially through the anoxic, aeration and MBR zones, thereby maintaining equilibrium in the system by removing water via the MBRs at a rate equal to influent wastewater flow, without the need to remove W.A.S. during a period of such surge or storm mode.

2. The sewage treatment system of claim 1, wherein the MBRs are sized for a design flow through said main process lines of Q, and wherein the system in a surge or storm mode of operation is capable of receiving influent greater than 2Q.

3. The sewage treatment system of claim 2, wherein the system in the surge or storm mode of operation is capable of receiving influent of at least about 3Q.

4. The sewage treatment system of claim 1, wherein the means for recycling M.L.S.S. from the main process lines recycles at a rate of about 1Q to 10Q, where Q is the flow rate of influent wastewater into the system.

5. The sewage treatment system of claim 4, wherein the means for recycling operates at a rate of about 4Q.

6. The sewage treatment system of claim 1, wherein the MBR zones in all process lines are positioned as the last zone in the series of zones.

7. The sewage treatment system of claim 1, wherein the portion of M.L.S.S. received in the special process line is received directly in the MBR zone of the special process line.

8. The sewage treatment system of claim 1, wherein the stabilized or digested W.A.S. removed from the MBR zone of the special process line is at about 1% to 5% solids content.

9. The sewage treatment system of claim 8, wherein the stabilized or digested W.A.S. removed from the MBR zone of the special process line is at about 3% solids content.

10. The sewage treatment system of claim 1, wherein the inflow means provides for influent wastewater to enter into the anoxic zones.

11. The sewage treatment system of claim 1, wherein each process line further includes an anaerobic zone, upstream of the anoxic zone, and wherein influent enters the main process lines at the anaerobic zones, via the inflow means.

12. The sewage treatment system of claim 11, wherein each process line comprises zones as follows: anaerobic, anoxic, aerobic, anoxic, MBR.

13. The sewage treatment system of claim 1, wherein the aerobic zones of each process line are controlled to allow simultaneous nitrification/denitrification wherein dissolved oxygen content is controlled to effect nitrification and denitrification in the same zone.

14. A method for operating a sewage treatment system, the system including a series of parallel main process lines each including anoxic and aerobic zones and an MBR zone in series, with influent wastewater received in the main process lines, and at least one additional, special process line having similar zones, comprising the steps of:

in the normal operation mode in which influent wastewater is approximately at design flow, normally operating the system to deliver a portion of M.L.S.S. from the main process lines to the special process lines, and internally recycling sludge among the zones of the special process line during normal operation, so as to produce a further thickened and stabilized or digested W.A.S., in the normal operation mode, removing stabilized or digested W.A.S. from the MBR zone of the special process line, in the normal operation mode, recycling effluent M.L.S.S. from the main process lines back to re-enter the main process lines to mix with wastewater in the main process lines while delivering said portion of M.L.S.S. to the special process line wherein further thickening and digestion or stabilization of sludge occur, and in a surge or storm mode of operation when influent wastewater flow rate is more than twice design flow, receiving the influent wastewater in all process lines and operating all process lines in the same manner, with parallel streams of influent wastewater being processed serially through the anoxic, aeration and MBR zones similarly and in parallel through all process lines including the special process line, and in the surge or storm mode of operation, recycling effluent M.L.S.S. from all process lines back to enter the process lines to mix with wastewater in the process lines, thereby, in the surge or storm mode, maintaining equilibrium in the system by removing water via the MBRs of all process lines at a rate essentially equal to influent wastewater flow, without the need to remove W.A.S. during such surge or storm mode.

15. The method of claim 14, including a step of transitioning between the normal mode of operation and the surge or storm mode of operation, the transitioning step including discontinuing delivery of M.L.S.S. from the main process lines to the special process line, discontinuing internal recycling in the special process line, introducing influent and recycled wastewater in the manner of the main process lines to the special process line, discontinuing removal of stabilized or digested W.A.S. from the special process line, recycling M.L.S.S. from all process lines to re-enter all process lines to mix with wastewater in the process lines, and redistributing solids from the special process line to all process lines.

16. The method of claim 14, wherein, with W.A.S. not being removed from the special process line during the surge or storm mode, solids are held in the system during the surge or storm rate of inflow and are allowed to increase from about 0.8% or 1% solids up to about 1.8% solids or more, until the storm or surge event passes.

17. The method of claim 16, wherein, after the surge or storm event passes, the special process line is converted back to normal mode of operation, digesting or stabilizing sludge, receiving sludge from the normal process lines, further thickening sludge and with stabilized and thickened sludge removed from the special process line.

18. The method of claim 14, wherein in normal operation M.L.S.S. exits the main process lines at approximately 1% solids, and wherein thickened and stabilized or digested sludge is wasted from the special process line at approximately 3% solids; and wherein, in surge or storm mode of operation, M.L.S.S. is continuously recycled through all process lines thus gradually increasing solids content of the M.L.S.S. during the surge or storm event.

19. The method of claim 14, wherein the process lines each include an anaerobic zone upstream of the anoxic zone, with influent wastewater in the main process lines being delivered to the anaerobic zones, and with M.L.S.S. being recycled so as to bypass the anaerobic zones.

20. The method of claim 14, wherein the aerobic zone of each process line comprises a simultaneous nitrification/denitrification zone wherein dissolved oxygen content is controlled to effect nitrification and denitrification in the same zone.

21. The method of claim 14, wherein, in the surge or storm mode of operation, W.A.S. is not removed unless and until solids content in the system reaches about 1.8%, after which wasting occurs from all process lines.

* * * * *